Figure 1:
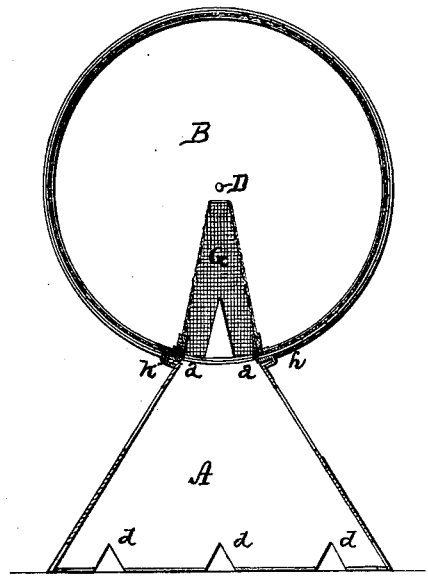
Figure 2:
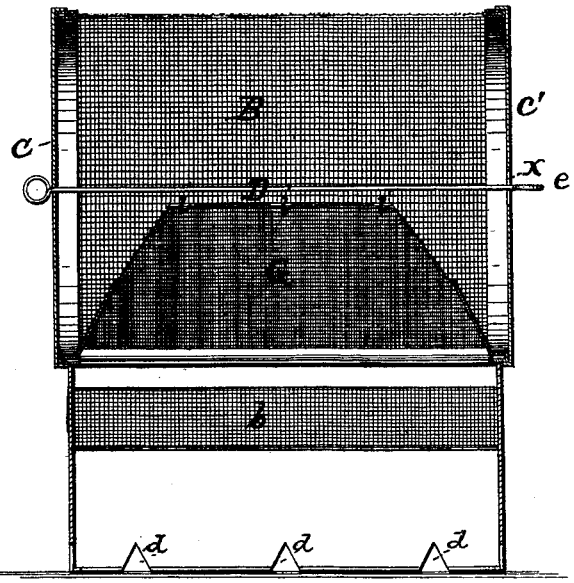

J. W. BRIDWELL.
FLY-TRAP.

No. 185,664. Patented Dec. 26, 1876.

WITNESSES: INVENTOR:

UNITED STATES PATENT OFFICE.

JAMES W. BRIDWELL, OF LEESBURG, OHIO.

IMPROVEMENT IN FLY-TRAPS.

Specification forming part of Letters Patent No. 185,664, dated December 26, 1876; application filed October 14, 1876.

*To all whom it may concern:*

Be it known that I, J. W. BRIDWELL, of Leesburg, in the county of Highland and State of Ohio, have invented certain new and useful Improvements in Fly-Traps; and I do hereby declare the following to be a full, clear, and exact description of the invention, such as will enable others skilled in the art to which it pertains to make and use it, reference being had to the accompanying drawings, which form part of this specification.

The nature of my invention consists in the construction and arrangement of a fly-trap, as will be hereinafter more fully set forth.

The accompanying drawing fully illustrates my invention, and like letters in the different figures indicate corresponding parts.

My fly-trap is made in two parts, a base and a horizontal cylinder, B. The base A is made cone-shaped, with inclined sides and vertical ends, and with an opening at the top extending its entire length. At the top, along each side, is an outwardly-projecting flange, a, and below said flange a portion of the side of the base is formed of wire-cloth b. In the bottom edges of the base A are made entrances d d, through which the flies pass into the trap. The base A thus constructed may be placed on a suitable board or bed plate, on which the bait should also be placed; or, such board or bed-plate may be dispensed with, if desired.

The cylinder B is made of wire-cloth, with heads C C' of wire-cloth, metal, or wood. The head C is made fast to the cylinder, while the head C' is made removable, and is fastened by means of a rod, D, which passes through the center of the head C and has an eye or loop, e, on its end. This eye is passed through a slit, x, in the center of the head C', and the rod then turned one-fourth around, when the head will be locked in place on the end of the cylinder. The head C' can easily be removed from the cylinder when required.

In the bottom of the horizontal cylinder B is a longitudinal opening corresponding in size with the opening in the top of the base A, and on each side of said opening in the cylinder is a grooved rib or strip, h, to slip over the flanges a on the base, thus admitting of the base and cylinder being easily and quickly attached and detached, as required.

Over the opening in the bottom of the cylinder B is affixed a stationary "fly-cone," G, of wire-cloth, having one or more openings, i, in its apex for the flies to enter into the cylinder.

This fly trap is cheap and simple in construction, and presents a neat appearance.

The two parts can easily be detached for cleaning, and it takes but a very small quantity of water to immerse the trap for killing the flies.

Having thus fully described my invention, what I claim as new, and desire to secure by Letters Patent, is—

1. In a fly-trap, the conical base A, provided with top opening and side flanges a a, wire-cloth b in its sides, and entrances d d, in combination with the removable cylinder B, having grooved strips h h, substantially as and for the purposes herein set forth.

2. The horizontal wire-cloth cylinder B, provided with stationary head C, removable head C', fastening-rod D, and bottom opening with grooved side strips h h, and interior fly-cone G, in combination with the base A, substantially as and for the purposes herein set forth.

In testimony that I claim the foregoing I have hereunto set my hand this 9th day of October, 1876.

JAMES W. BRIDWELL.

Witnesses:
 GEO. W. HOUGH,
 RICHARD C. DELPH.